United States Patent
Mao et al.

(10) Patent No.: US 8,636,913 B2
(45) Date of Patent: Jan. 28, 2014

(54) REMOVING RESIDUES IN MAGNETIC HEAD FABRICATION

(75) Inventors: Guomin Mao, San Jose, CA (US); Satyanarayana Myneni, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 244 days.

(21) Appl. No.: 13/333,156

(22) Filed: Dec. 21, 2011

(65) Prior Publication Data

US 2013/0161185 A1  Jun. 27, 2013

(51) Int. Cl.
*B44C 1/22* (2006.01)
*C03C 15/00* (2006.01)

(52) U.S. Cl.
USPC ............. 216/22; 216/66; 216/81; 438/692; 438/712

(58) Field of Classification Search
USPC .................. 216/22, 66, 81; 438/692, 712
See application file for complete search history.

(56) References Cited

U.S. PATENT DOCUMENTS

| | | | |
|---|---|---|---|
| 7,134,941 B2 | 11/2006 | Boumerzoug et al. | |
| 7,444,740 B1 * | 11/2008 | Chung et al. | 29/603.16 |
| 7,563,381 B2 | 7/2009 | Baer et al. | |
| 7,587,810 B2 | 9/2009 | Le | |
| 7,595,005 B2 | 9/2009 | Balasubramaniam | |
| 7,819,979 B1 | 10/2010 | Chen et al. | |
| 8,262,919 B1 * | 9/2012 | Luo et al. | 216/22 |
| 2004/0029494 A1 | 2/2004 | Banerjee et al. | |
| 2005/0050716 A1 * | 3/2005 | Sasaki et al. | 29/603.15 |
| 2006/0234483 A1 * | 10/2006 | Araki et al. | 438/551 |
| 2007/0248767 A1 | 10/2007 | Okura et al. | |
| 2007/0293054 A1 | 12/2007 | Lee et al. | |
| 2009/0007416 A1 * | 1/2009 | Contreras et al. | 29/603.07 |
| 2009/0090382 A1 | 4/2009 | Morisada et al. | |
| 2010/0112487 A1 | 5/2010 | Le et al. | |
| 2010/0296193 A1 * | 11/2010 | Kim et al. | 360/123.12 |
| 2011/0130007 A1 | 6/2011 | Ching et al. | |
| 2011/0146061 A1 | 6/2011 | Funada et al. | |
| 2012/0111826 A1 * | 5/2012 | Chen et al. | 216/22 |
| 2012/0125885 A1 * | 5/2012 | Chen et al. | 216/22 |

FOREIGN PATENT DOCUMENTS

JP  63-24078  2/1988

* cited by examiner

*Primary Examiner* — Binh X Tran
(74) *Attorney, Agent, or Firm* — Patterson & Sheridan, LLP

(57) ABSTRACT

The present invention generally relates to a method of forming a magnetic head while ensuring residues do not negatively impact the magnetic head. In particular, when performing a RIE process to remove DLC, oxygen gas can leave residues that will negatively impact the RIE process performed on the next substrate to enter the chamber. By utilizing $CO_2$ rather than $O_2$, the residues will not be created and therefore will not impact processing of the next substrate that enters the chamber.

20 Claims, 7 Drawing Sheets

REMOVING RESIDUES IN MAGNETIC HEAD FABRICATION

BACKGROUND OF THE INVENTION

1. Field of the Invention

Embodiments of the present invention generally relate to a method of forming a magnetic head without producing undesired residues.

2. Description of the Related Art

In the process of fabricating magnetic write heads, there are many steps that involve removing residues or thin films from metal surfaces, such as ruthenium. The residues can be carbon containing films that have been used as stopping layers during a reactive ion etching (RIE) process, as masking layers used in an ion milling process, as stopping layers used during a chemical mechanical polishing (CMP) process, or masking layers used for a wet etching process. Examples of the carbon containing films that may be used include polyimide, diamond like carbon (DLC) films or photoresist films.

There are two approaches to removing the carbon containing residues. The first approach involves wet chemical stripping using solvents such as NMP. The second approach is a dry plasma strip. Some films, such as amorphous carbon, polyimide or barrier antireflective coatings (BARCs), are more effectively removed using a plasma rather than a wet chemical stripping process. Plasma stripping is done in two ways. One way involves using a source plasma with no bias (for process tool simplicity and cost savings). Another way involves using a bias RIE process combined with the source power to remove the residues. While the source plasma etcher, commonly referred to as a plasma stripper, can be used to remove organic BARC, the amorphous carbon films can only be removed by the RIE etcher where both the source and bias powers are used.

In magnetic head fabrication, there are many instances where carbon films are deposited on a ruthenium surface and used as a stopping layer or a mask layer. When the RF bias is applied to the substrate to remove the carbon film from the ruthenium or other metal surface, non-volatile metal complexes are produced which tend to redeposit within the processing chamber, such as on process chamber walls, electrodes, chamber liner, and the gas distributer or showerhead. Since the plasma etch process is very sensitive to the environment, the redeposition of the metal complexes will cause a drift in the RIE process on any subsequently processed substrates within the same RIE chamber so that the profile control for any critical dimensions will be affected. Additionally, even for the non-critical applications such as residue removal, the etch rate may drop and the etch uniformity may degrade such that the residues are not removed effectively.

Therefore, there is a need in the art for a method to manufacture a magnetic write head without forming metal complexes that interfere with subsequent processing.

SUMMARY OF THE INVENTION

The present invention generally relates to a method of forming a magnetic head while ensuring residues do not negatively impact the magnetic head. In particular, when performing a RIE process to remove DLC, oxygen gas can leave residues that will negatively impact the RIE process performed on the next substrate to enter the chamber. By utilizing $CO_2$ rather than $O_2$, the residues will not be created and therefore will not impact processing of the next substrate that enters the chamber.

In one embodiment, a method for making a magnetic write pole head comprises forming a main pole trench in a substrate having a hardmask thereover; depositing a ruthenium layer within the trench and over the hardmask; depositing magnetic material over the ruthenium layer and filling the trench with the magnetic material; removing selected portions of the magnetic material to expose the ruthenium layer; depositing a DLC layer over the exposed ruthenium layer; performing a CMP process to remove portions of the magnetic material; and RIE-ing the DLC layer with $CO_2$ to remove the DLC layer.

In another embodiment, a method for making a magnetic write pole head comprises forming a main pole trench in a substrate having a hardmask thereover; depositing a ruthenium layer within the trench and over the hardmask; depositing magnetic material over the ruthenium layer and filling the trench with the magnetic material; removing selected portions of the magnetic material to expose the ruthenium layer; depositing a DLC layer over the exposed ruthenium layer; performing a CMP process to remove portions of the magnetic material; and RIE-ing the DLC layer with $CO_2$ to remove the diamond like carbon layer, wherein the RIE-ing is performed while biasing the substrate at a power range of between about 30 watts to about 60 watts and while applying a source power of between about 200 watts to about 400 watts.

In another embodiment, a method for making a magnetic write pole head comprises forming a NiCr RIE stop layer over a substrate; forming an alumina layer over the RIE stop layer; forming a hardmask over the alumina layer; ion milling through the hardmask to expose the alumina; RIE-ing the exposed alumina to form a main pole trench in the alumina layer and expose the RIE stop layer; depositing a ruthenium layer within the trench, over the hardmask and over the exposed RIE stop layer; depositing NiFe or CoNiFe magnetic material over the ruthenium layer and filling the trench with the magnetic material; removing selected portions of the magnetic material to expose the ruthenium layer; depositing a DLC layer over the exposed ruthenium layer; performing a CMP process to remove portions of the magnetic material; and RIE-ing the DLC layer with $CO_2$ to remove the DLC layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a method of forming a magnetic head while ensuring residues do not negatively impact the magnetic head. In particular, when performing a RIE process to remove DLC, oxygen gas can leave residues that will negatively impact the RIE process performed on the next substrate to enter the chamber. By utilizing $CO_2$ rather than $O_2$, the residues will not be created and therefore will not impact processing of the next substrate that enters the chamber.

Figure 1:
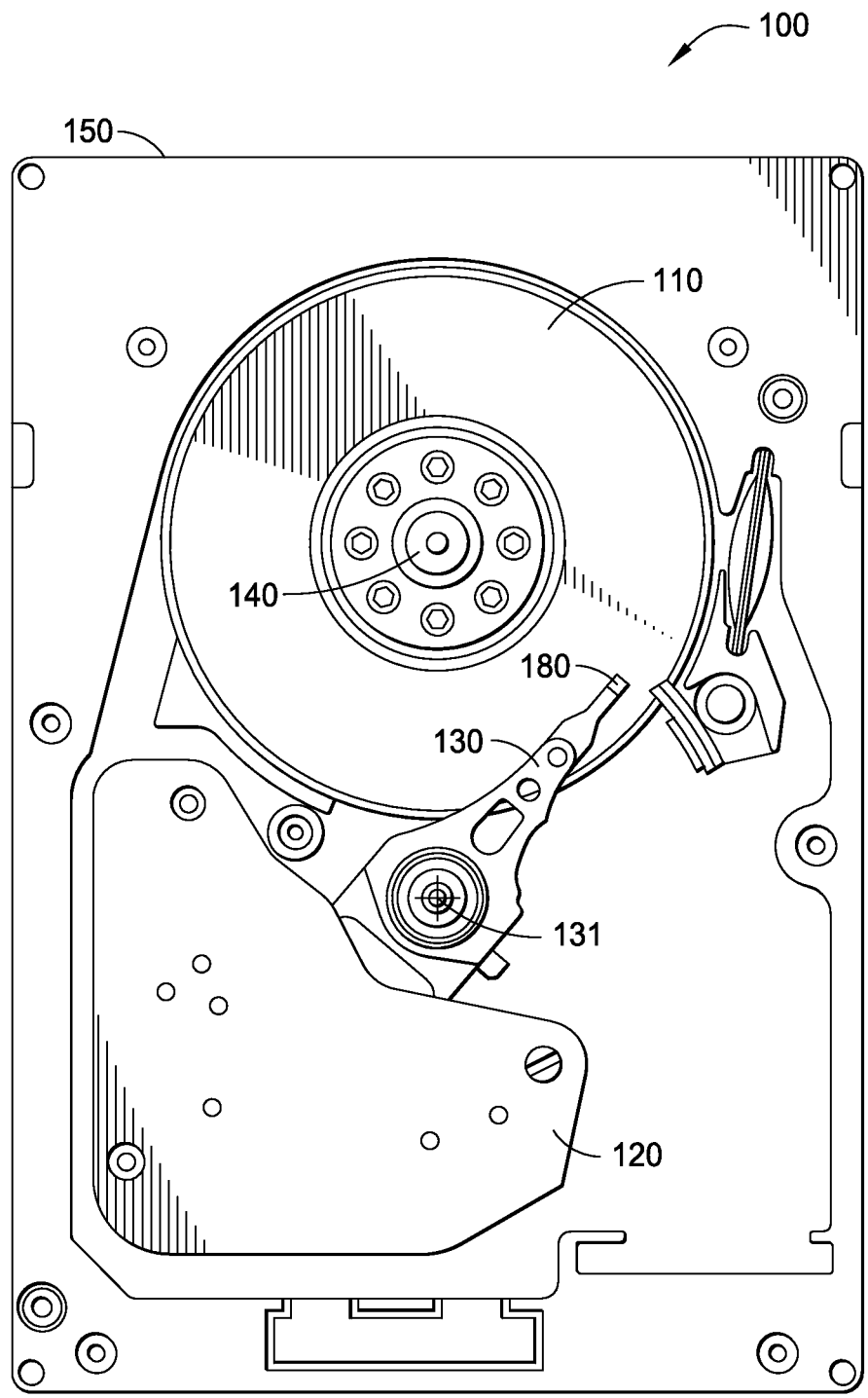
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms 130 may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
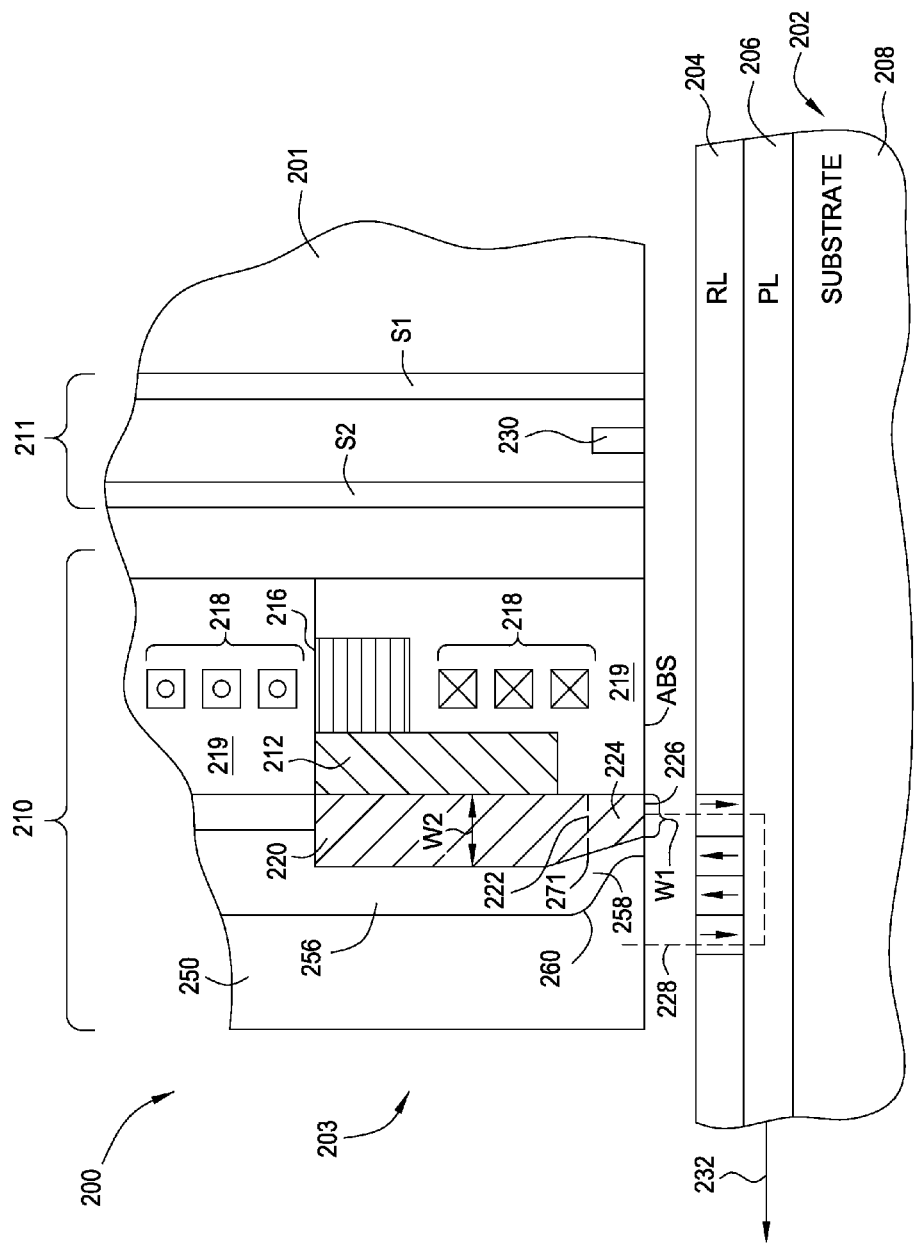
FIG. 2A is a side view of a read/write head and magnetic disk of the disk drive of FIG. 1, according to one embodiment of the invention.

FIG. 2A is a fragmented, cross-sectional side view through the center of a read/write head 200 mounted on a slider 201 and facing magnetic disk 202. The read/write head 200 and magnetic disk 202 may correspond to the electromagnetic head 180 and magnetic disk 110, respectively in FIG. 1. The magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS (air bearing surface), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

The magnetic read head 211 is a magnetoresistive (MR) read head that includes an MR sensing element 230 located between MR shields S1 and S2. It is contemplated that the magnetic read head 211 can be a magnetic tunneling junction (MTJ) read head that includes an MTJ sensing device located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR (or MTJ) sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. It is contemplated that the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Figure 2B:
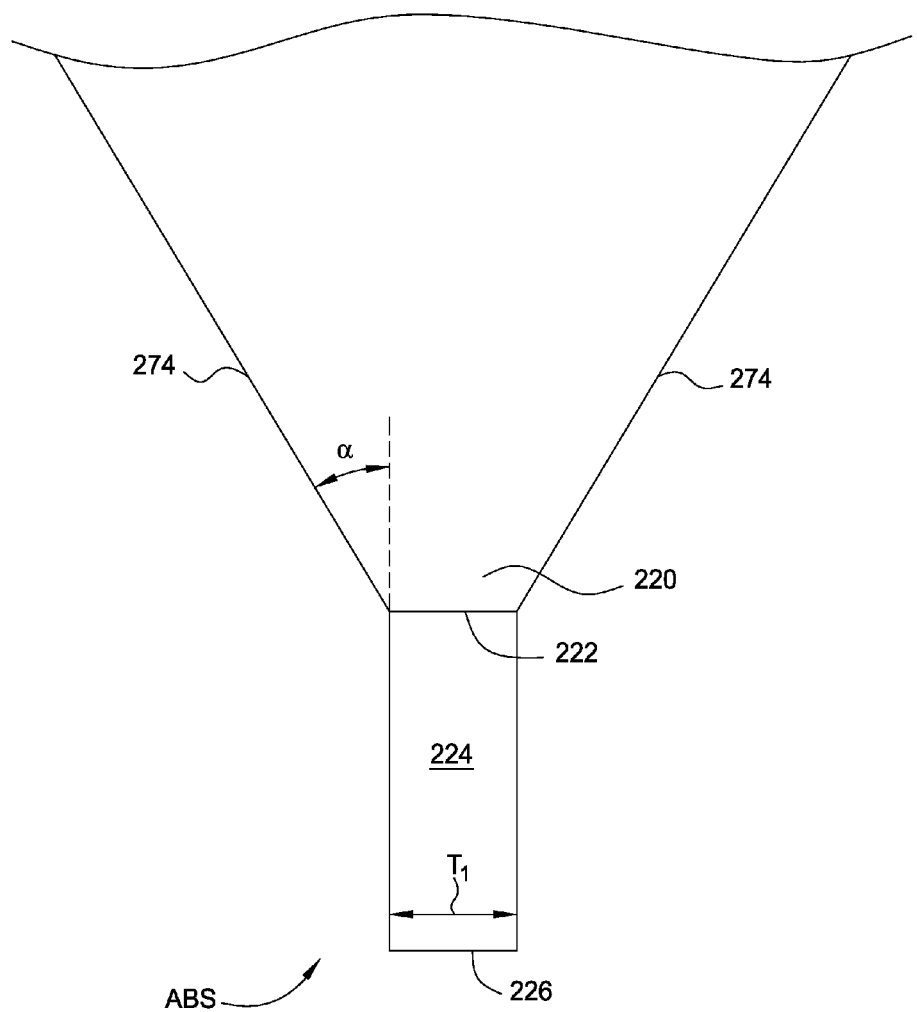
FIG. 2B is an enlarged top view of a portion of the read/write head of FIG. 2A, according to a further embodiment of the invention.

Write pole 220 is a flared write pole and includes a flare point 222 and a pole tip 224 that includes an end 226 that defines part of the ABS. The width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2A, in alternative embodiment, the tapered region 271 may include a plurality of tapered surface with different taper angles with respect to the ABS. The fabrication of the tapered region 271 is discussed in greater detail below.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2A further illustrates one embodiment of the upper return pole or magnetic shield 250 that is separated from write pole 220 by a nonmagnetic gap layer 256. The magnetic shield 250 may be a trailing shield wherein substantially all of the shield material is on the trailing end 203. Alternatively, the magnetic shield 250 may be a wrap-around shield wherein the shield covers the trailing end 203 and also wraps around the sides of the write pole 220. As FIG. 2A is a cross section through the center of the read/write head 200, FIG. 2A represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, Cr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged top view of the write pole 220 of FIG. 2A, with the shield layer 250 and the gap layer 256 removed to show details of the write pole 220, according to an embodiment of the invention. The write pole 220 includes flared sides 274, which extend from the flare point 222 away from the ABS, such that the main pole increases from a first width $T_1$ to greater widths in a direction away from the ABS.

In some embodiments, the first width, $T_1$ is between 20 nm and 150 nm. The flared sides 274 form an angle α with respect to a plane perpendicular to the ABS surface. In one embodiment α is between about 30 degrees and about 60 degrees. The flare point 222 may be between about 30 nm and about 275 nm from the ABS.

Figure 3A:
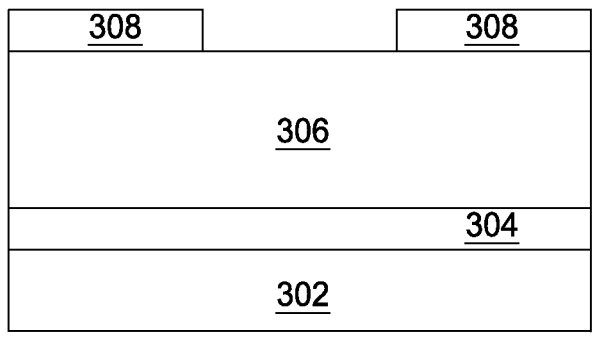
FIGS. 3A-3K are schematic illustrations of a write head at various stages of manufacture according to one embodiment of the invention.

FIGS. 3A-3K are schematic illustrations of a write head at various stages of manufacture according to one embodiment of the invention. As shown in FIG. 3A, a RIE stop layer 304 is formed over a substrate 302, a bulk insulating layer 306 is formed over the RIE stop layer 304, and a hardmask layer is deposited, then a BARC layer (not shown) and photoresist layer (not shown) are coated and the photoresist mask is formed using photolithography. Thereafter a RIE process, with chemistry of fluorocarbon based or oxygen based or their mixture along with addition of Ar gas, can be performed to open the BARC followed with an ion mill process to transfer the photoresist mask pattern onto the hardmask layer and to form a hardmask 308 over the bulk insulating layer 306. Thereafter, a liftoff process (combination of NMP stripping and fence removing) can be performed to remove the remaining photoresist and residues created in ion mill process and expose hardmask layer. In one embodiment, the liftoff process is not necessary after RIE and the photoresist mask can remain and form a dual mask together with the hardmask during the subsequent bulk insulating RIE process. The photoresist would be mostly consumed, and all the residues can be removed after the bulk insulating RIE. In one embodiment, the RIE stop layer 304 comprises NiCr, the bulk insulating layer 306 comprises alumina, and the hardmask 308 comprises NiCr or CR. In another embodiment. The BARC layer coating is not necessary for a relatively loose CD (critical dimension) control, hence no BARC opening RIE is applied, the ion mill process is used to transfer the photoresist mask pattern onto the hardmask 308 directly.

Figure 3B:
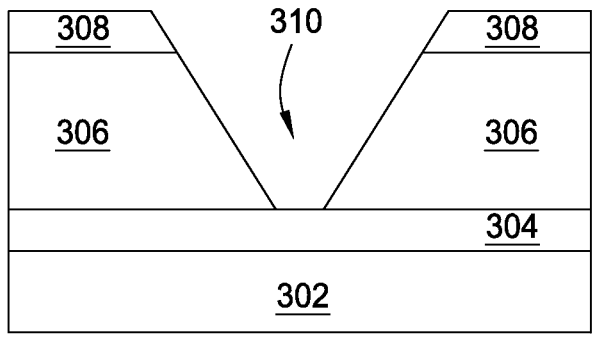
Figure 3C:
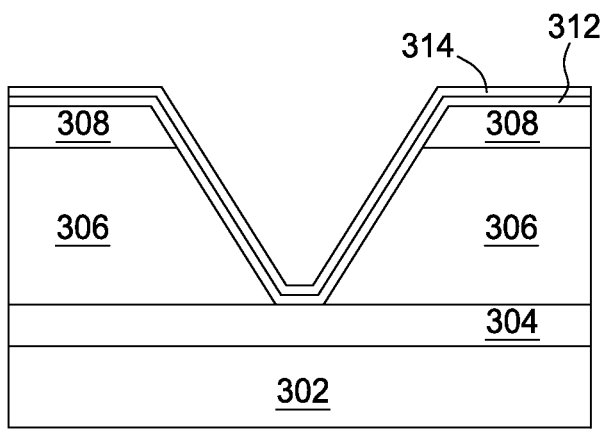

A chlorine based RIE process is then performed to remove portions of the bulk insulating layer 306 and expose the underlying RIE stop layer 304. As shown in FIG. 3B, the resulting trench 310 that is formed is the main pole trench 310 and has a taper. A ruthenium layer 312 and a magnetic seed layer 314 are deposited over the remaining hardmask 308 and within the trench 310 as shown in FIG. 3C. The ruthenium layer 312 will be used to protect the magnetic pole during a subsequent etching process that is used to remove the surrounding bulk insulating layer 306. Additionally, the ruthenium layer 312 protects the main pole during the plating process that is used to form the side shield of the main pole. The ruthenium layer 312 also serves as an ion mill stop layer and as a CMP stop layer in later processing. The seed layer 314 may comprise the same material as will be used for the bulk magnetic material. In one embodiment, the seed layer 314 comprises FeNi or CoFeNi.

Figure 3D:
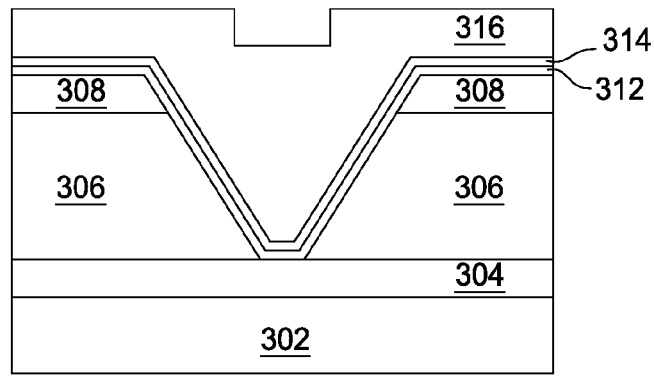
Figure 3E:
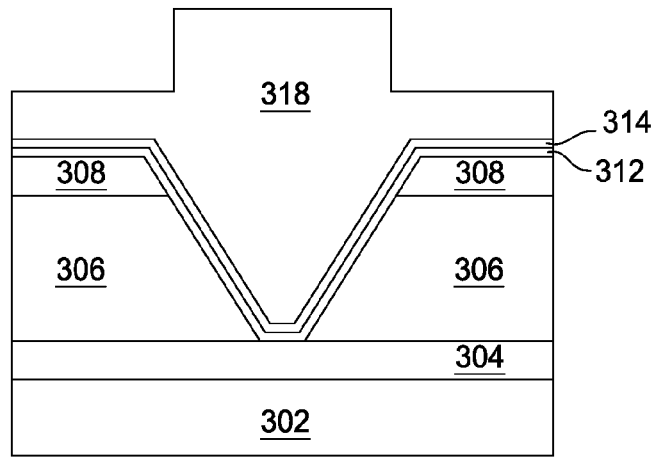

An electroplating process is then performed to deposit the bulk magnetic material 316. However, as shown in FIG. 3D, the electroplating results in a generally uniform deposition so that the overfill of the bulk magnetic material 316 may not be sufficient in the area over the trench 310. Therefore, as shown in FIG. 3E, additional magnetic material may be deposited to complete the bulk magnetic material 318. In order to deposit the additional magnetic material, a photoresist mask is formed over the magnetic material 316 and then the additional magnetic material is electroplated over the exposed magnetic material 316. The photoresist mask is then removed. The additional magnetic material that forms the resulting magnetic material 318 is the same material as the magnetic material 316.

Figure 3F:
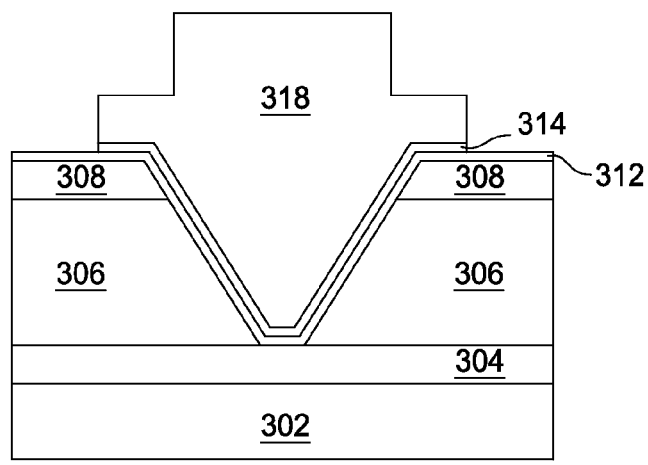
Figure 3G:
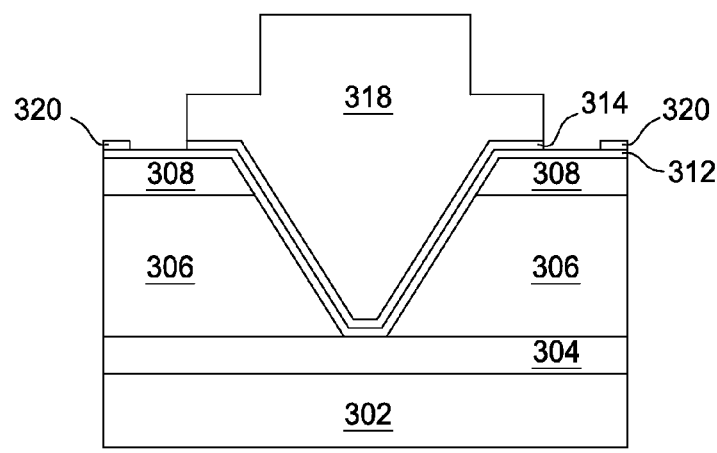

Some of the excess magnetic material 318 is then removed by an ion milling process as shown in FIG. 3F. During the ion milling process, the ruthenium layer 312 acts as an ion milling stop layer. The excess magnetic material 318 that is removed includes portions of the seed layer 314. The ion mill process is controlled by the endpoint of the ruthenium. Following the ion milling process, DLC is selectively deposited over the exposed ruthenium layer 312 as shown in FIG. 3G. In order to deposit the DLC layer 320, a photoresist mask is formed over the magnetic material 318 and portions of the exposed ruthenium layer 312. Following deposition of the DLC layer 320, the photoresist mask is removed.

Figure 3H:
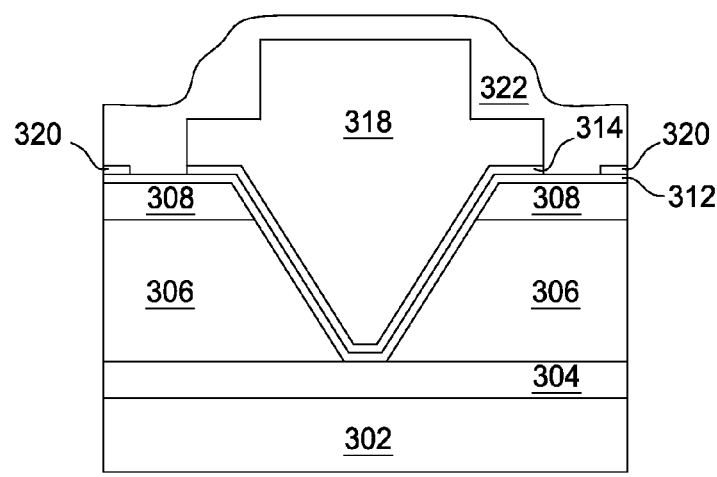
Figure 3I:
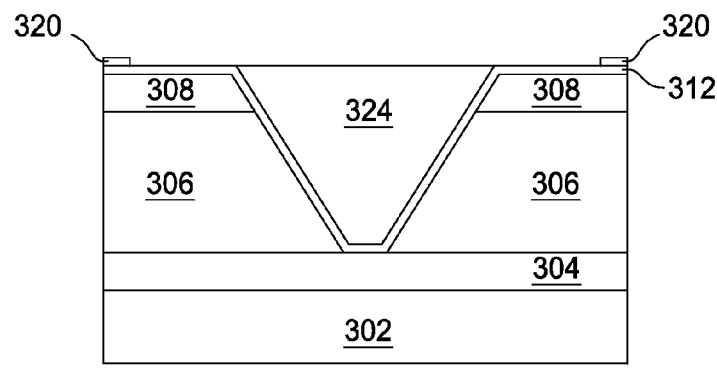

An alumina layer 322 is then bulk deposited over the DLC layer 320, the exposed ruthenium layer 312 and the magnetic material 318 as shown in FIG. 3H. The alumina protects the field area (i.e., the area outside of the trench 310) during the subsequent CMP processing. The CMP process is then performed to remove the alumina layer 322 and portions of the magnetic material 318 outside of the trench 310 such that the main pole 324 remains as shown in FIG. 3I. Both the ruthenium 312 and the DLC layer 320 function as a CMP stop layer during the CMP process. Once the alumina 322 has been removed, portions of the ruthenium layer 312 are exposed, the DLC layer 320 is exposed, and the main pole 324 is exposed.

Figure 3J:
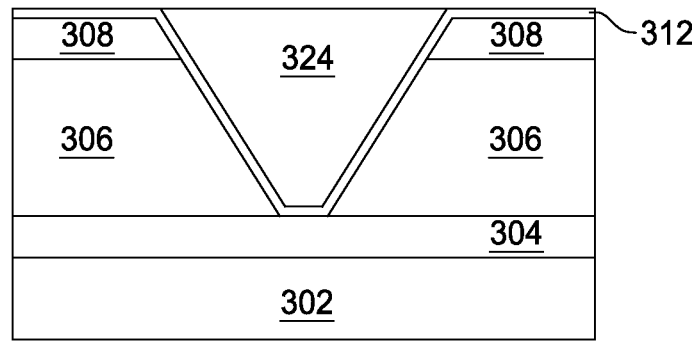

The DLC layer 320 is then removed by an RIE process as shown in FIG. 3J. Rather than utilize an oxygen plasma, a $CO_2$ plasma is used for the RIE process. As discussed above, if $O_2$ is used to remove the DLC layer 320, possible residues from the CMP process or the ion milling process, the charged ions and radicals in the plasma can actively react with the ruthenium metal atoms on the surface and the energy of the dissociated oxygen particles can knock that ruthenium atoms out of the metal surface. Because the metal particles and most of the metal oxides are non-volatile, the particles and oxides tend to re-deposit on exposed portions of the RIE chamber. The significance of the redeposition depends on the types of metals and the critical nature of the subsequent RIE process performed in the RIE chamber. Therefore using $CO_2$ rather than $O_2$ is utilized.

To perform the RIE process with $CO_2$, a bias power to the substrate 302 is about 40 percent less than if $O_2$ was used. Specifically, a bias of between about 30 watts and about 60 watts is applied to the substrate 302 during the RIE process. In reducing the bias to the substrate, the source power is correspondingly increased to maintain total plasma intensity. The source power is about 200 watts to about 400 watts. The utilization of low bias power and high source power have effectively reduce the anisotropic ion bombardment to the substrate, and thus reduce the chance to sputter out the atoms of the exposed metal surface. The chamber pressure is about 8 mTorr to about 40 mTorr, which is at least 100 percent greater than the pressure utilized for $O_2$ RIE processes. Because of the higher pressure, the ions in the plasma have a greater probability to recombine with other ions or electrodes thus becoming less reactive with ruthenium. The combination of greater chamber pressure, lower bias power and higher source power have made less effective in sputtering ruthenium atoms which could otherwise lead to redeposition.

It is believed that the amount of ions and radicals produced in a $CO_2$ plasma leads to less ruthenium redeposition as compared to $O_2$ plasma. The dissociation of $CO_2$ in plasma produces ionized species such as $CO^+$, $CO^{+2}$ and O radicals while the dissociation of $O_2$ produces ionized species such as $O^+$, $O^{+2}$ and O radicals. Under the same RIE conditions (i.e., same powers, pressure and gas flow), the species created in the $O_2$ plasma should have more reactivity than $CO_2$ as the etch rate in $O_2$ plasma is much faster than that in a $CO_2$ plasma. Additionally, it is believed that $O_2$ plasma has a higher reactivity with ruthenium which causes some of the byproducts to redeposit back onto exposed chamber areas and thus influence the subsequent RIE processes performed later in the chamber. In addition to utilizing $CO_2$, an inert gas may be utilized. Examples of inert gases that may be utilized include $N_2$ and He. In one embodiment, only the $CO_2$ gas is used to produce the plasma, the $CO_2$ gas flow range can be ranged from 10 sccm to 50 sccm. In another embodiment, the $N_2$ is added to $CO_2$ plasma, the $N_2$ gas flow range is from about 5 sccm to 25 sccm that the gas flow ratio of $N_2$ to $CO_2$ is no more than 50% to insure there are enough oxygen related reactive species in the plasma to maintain certain etch rate to remove the carbon film. Since $N_2$ plasma is less reactive with ruthenium than $CO_2$ plasma and $O_2$ plasma, the addition of $N_2$ can reduce the reaction with ruthenium and thus reduce redeposition on the exposed parts of the RIE chamber. In the third embodiment, He gas is added into $CO_2$ plasma, the He gas flow is from 5 sccm to 15 sccm. The function of He is to dilute the $CO_2$ plasma and reduce the bombardment of the ions to the substrate. However, more He addition is not desired because the He could cause plasma striking and stability issue. In the forth embodiment, both $N_2$ and He are added into $CO_2$ plasma.

Figure 3K:
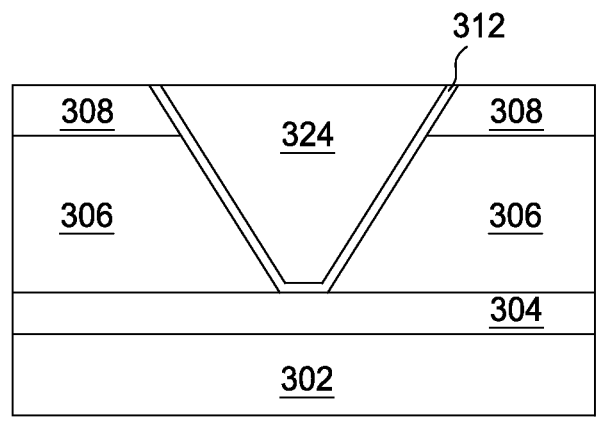

As shown in FIG. 3K, after the DLC layer 320 has been removed, an ion milling process is performed to remove any exposed ruthenium 312, and the hardmask layer 308. The ion mill is endpoint controlled and certain amount over mill is performed to ensure the completely remove of the hardmask, therefore there is an excesses magnetic material 324 being removed.

By utilizing a $CO_2$ plasma for an RIE process, DLC can be removed from a write pole head without reacting with the exposed ruthenium and producing undesired reaction byproducts that redeposit onto exposed portions of the RIE chamber. Because there is no or neglected amount of undesired material redeposit on exposed portions of the chamber, the RIE process does not negatively impact RIE processes performed on substrates that are processed in the chamber thereafter.

While the foregoing is directed to embodiments of the present invention, other and further embodiments of the invention may be devised without departing from the basic scope thereof, and the scope thereof is determined by the claims that follow.

What is claimed is:

1. A method for making a magnetic write pole head, comprising:
   forming a main pole trench in a substrate having a hardmask thereover;
   depositing a ruthenium layer within the trench and over the hardmask;
   depositing magnetic material over at least part of the ruthenium layer and at least partially filling the trench with the magnetic material;
   removing selected portions of the magnetic material to expose the ruthenium layer;
   depositing a diamond like carbon layer over the exposed ruthenium layer;
   performing a chemical mechanical polishing process to remove at least a portion of the magnetic material; and
   reactive ion etching the diamond like carbon layer with $CO_2$ to remove the diamond like carbon layer.

2. The method of claim 1, wherein the reactive ion etching is performed at a chamber pressure of between about 8 mTorr to about 40 mTorr.

3. The method of claim 2, wherein the reactive ion etching is performed while biasing the substrate at a power range of between about 30 watts to about 60 watts.

4. The method of claim 3, wherein the reactive ion etching is performed while applying a source power of between about 200 watts to about 400 watts.

5. The method of claim 4, wherein the reactive ion etching is additionally performed with an inert gas and $N_2$ gas.

6. The method of claim 5, wherein the inert gas comprises helium.

7. The method of claim 6, further comprising ion milling the ruthenium and hardmask NiCr or Cr.

8. The method of claim 7, wherein the magnetic material comprises NiFe or CoNiFe.

9. A method for making a magnetic write pole head, comprising:
    forming a main pole trench in a substrate having a hardmask thereover;
    depositing a ruthenium layer within the trench and over the hardmask;
    depositing magnetic material over the ruthenium layer and filling the trench with the magnetic material;
    removing selected portions of the magnetic material to expose the ruthenium layer;
    depositing a diamond like carbon layer over the exposed ruthenium layer;
    performing a chemical mechanical polishing process to remove portions of the magnetic material; and
    reactive ion etching the diamond like carbon layer with $CO_2$ to remove the diamond like carbon layer, wherein the reactive ion etching is performed while biasing the substrate at a power range of between about 30 watts to about 60 watts and while applying a source power of between about 200 watts to about 400 watts.

10. The method of claim 9, wherein the reactive ion etching is additionally performed with an inert gas or with addition of $N_2$ gas.

11. The method of claim 10, wherein the inert gas comprises helium.

12. The method of claim 11, further comprising ion milling the ruthenium and hardmask NiCr or Cr.

13. The method of claim 12, wherein the magnetic material comprises NiFe or CoNiFe.

14. A method for making a magnetic write pole head, comprising:
    forming a NiCr reactive ion etching stop layer over a substrate;
    forming an alumina layer over the reactive ion etching stop layer;
    forming a hardmask over a portion of the alumina layer;
    reactive ion etching exposed alumina to form a main pole trench in the alumina layer and expose the reactive ion etching stop layer;
    depositing a ruthenium layer within the trench, over the hardmask and over the exposed reactive ion etching stop layer;
    depositing NiFe or CoFeNi magnetic material over the ruthenium layer and filling the trench with the magnetic material;
    removing selected portions of the magnetic material to expose the ruthenium layer;
    depositing a diamond like carbon layer over the exposed ruthenium layer;
    performing a chemical mechanical polishing process to remove portions of the magnetic material; and
    reactive ion etching the diamond like carbon layer with $CO_2$ to remove the diamond like carbon layer.

15. The method of claim 14, wherein the reactive ion etching of the diamond like carbon layer is performed at a chamber pressure of between about 8 mTorr to about 40 mTorr.

16. The method of claim 15, wherein the reactive ion etching of the diamond like carbon layer is performed while biasing the substrate at a power range of between about 30 watts to about 60 watts.

17. The method of claim 16, wherein the reactive ion etching of the diamond like carbon layer is performed while applying a bias of between about 200 watts to about 400 watts.

18. The method of claim 17, wherein the reactive ion etching of the diamond like carbon layer is additionally performed with an inert gas or addition of $N_2$ gas.

19. The method of claim 18, wherein the inert gas comprises helium.

20. The method of claim 19, further comprising ion milling the ruthenium.

* * * * *